United States Patent Office 3,259,545
Patented July 5, 1966

3,259,545
STABLE ALUMINUM HYDROXIDE GEL OR ALUMINUM HYDROXIDE-SODIUM ZIRCONIUM LACTATE ANTIPERSPIRANT STICK
W Kedzie Teller, Kingston, N.J., assignor, by mesne assignments, to Wallace & Tiernan, Inc., Belleville, N.J., a corporation of Delaware
No Drawing. Filed July 10, 1961, Ser. No. 122,629
8 Claims. (Cl. 167—90)

This invention relates to a stable perspiration inhibiting material in the form of a soap gel stick which contains a base of sodium stearate and glycol and/or alcohol having distributed therein material having an aluminum hydroxy moiety in an active perspiration-inhibiting state.

The present application is a continuation-in-part of copending application, Serial No. 653,050, filed April 16, 1957, now abandoned, which in turn is a continuation-in-part of application, Serial No. 520,918, filed July 8, 1955, now abandoned, which, in turn, is a continuation-in-part of application, Serial No. 486,976, filed February 8, 1955, now abandoned, and application, Serial No. 527,632, filed August 10, 1955, now abandoned.

The term aluminum hydroxy moiety herein refers to chemicals which contain an aluminum hydroxy constituent or substituent in an active perspiration-inhibiting state. The moiety may be part of an anti-perspirant agent (e.g., complex, compound, or composition). For example, the aluminum hydroxy moiety may be present in an aluminum hydroxide gel or aluminum chlorhydroxy complex such as produced by the examples set forth in U.S. Patents Nos. 2,392,531, 2,196,016 and 2,392,153. It is essential to the present invention that a 10% solution of all the constituents used in forming the soap gel stick have a pH of at least 7. Therefore, since complexes such as shown in the aforesaid patents do not normally permit such a 10% solution to reach this pH value, it is essential to include in the stick, in conjunction with the aluminum hydroxy moiety, simple alkali or mixed salts of an organic acid, such as exemplified by sodium and potassium lactates, and sodium zirconium lactate that (1) enables a 10% solution of all the constituents of the stick to have a pH of at least 7, (2) is soluble in and compatible with the alcohol and/or glycol, (3) complexes with the aluminum hydroxy moiety and (4) renders the resulting complex soluble in as well as compatible with the sodium stearate soap. These salts may be referred to as neutralizing-complexing agents.

The term "anti-perspirant agent" herein refers to complexes, compounds, and compositions which contain an aluminum hydroxy moiety in an active perspiration-inhibiting state and is intended to include a sufficient amount of a neutralizing-complexing agent (e.g., sodium lactate) to permit a 10% aqueous solution of all the ingredients of the stick to have a pH of at least 7 when such a solution would otherwise have a pH below 7.

Sodium stearate soap gel sticks have heretofore been known for various cosmetic purposes. These sticks are stable at normal atmospheric temperature ranges within certain known proportions of sodium stearate, alcohol and/or glycol, and water. They are extremely desirable inasmuch as on contact with the skin, they have a pleasant cooling effect and do not leave a greasy or waxy residue.

However, the sticks are extremely sensitive to chemical reaction. The provision of a metal ion in a form free to react with sodium stearate to produce another metallic stearate will render the stick unstable if that ion is present in any substantial quantity.

Because of this consideration, it has heretofore been considered impossible to produce an anti-perspirant soap gel stick since known anti-perspirant chemicals include an ionizable form of a polyvalent metal, as for example, aluminum chloride.

The introduction of such a material into a soap gel stick of the form heretofore described results within a comparatively short time in a breakdown of the stick. This breakdown normally involves a loss of the stick form either by the forming of a mush or by formation of a multiphase system.

When the aluminum hydroxide moiety is present in the form of an aluminum hydroxide gel, it has known remarkable high anti-perspirant qualities. When the gel is mixed with water and sodium stearate, however, a reaction occurs to form aluminum stearate. It has been discovered, however, that in spite of the normal ionic ability of the aluminum in aluminum hydroxide gel, when this material is enclosed in a sodium stearate gel stick, it does not so react and the stick is stable. The precise reason for this lack of reaction is not known. It is presumably due to an ionization-depressing effect produced by the high concentrations of alcohol and/or glycol in the stick. It is not solely due to that factor, however, since other ingredients of the stick also appear to effect or add to this ionization depression. That is, the proportions of sodium stearate and alcohol and water and the aluminum hydroxide are all inter-related in this ionization depression. One of the remarkable facts is, however, that so far as has been ascertained, the proportions of ingredients which will produce a stable sodium stearate stick coincide with the proportions which will sufficiently depress ionization to permit incorporation of an aluminum hydroxy moiety in the form of aluminum hydroxide gel, as the anti-perspirant ingredient.

If desired, the above-mentioned salts of organic acids may be included as one of the constituents of the aluminum hydroxide gel-containing stick in order to form a soap gel stick having improved stability.

Aluminum hydroxide, $Al(OH)_3$, is available in a form sometimes referred to as "true" aluminum hydroxide, wherein it is suspended in water in a concentration of about 10% aluminum oxide by weight. In this form it has a gel-like consistency. The gel may be "dried" to heavier consistencies and almost to apparent dryness to the touch without removing any of the water of combination by various well known techniques in which uncombined water is removed. In such "dried" form it still retains its identity as "true" aluminum hydroxide, which will be herein referred to as "aluminum hydroxide gel" since it may be used in any concentration with appropriate adjustment of quantities of other liquids and especially of water, which may be used. As is customary in connection with aluminum hydroxide in any such form the concentration or quantities thereof may be expressed in terms of aluminum oxide ($Al_2O_3$).

When the aluminum hydroxide moiety is present in the form of an aluminum chlorhydroxy complex such as produced by the examples in Patents Nos. 2,392,531, 2,196,016 and 2,392,153, it is essential that the complex be present in the stick along with a sufficient amount of an alkali salt of an organic acid to enable a 10% aqueous solution of all the constituents of the stick to have a pH of at least 7, otherwise a stable stick will not be formed.

Ethyl alcohol is preferred as the alcohol because of its acceptance in products of this general type; however, other suitable volatile alcohols may be used. For example, isopropyl alcohol or mixtures of ethyl alcohol with isopropyl alcohol or polyhydric alcohols may be used or may be included in the term "alcohol" in the following examples. In addition, glycols, such as propylene glycol may be used in forming my soap gel stick. If desired a mixture of alcohol and glycol, wherein either one of these constituents predominate, may be used.

It is recognized, of course, that the term "sodium stearate" is used commercially to apply to the sodium salt of a mixture of fatty acid of which stearic acid and palmitic acid predominate with relatively small proportions of closely related fatty acids. This term is used here in its commercial sense. However, this term is intended to include sodium stearate that is formed by admixing stearic acid with sodium hydroxide in situ with aqueous alcohol. The alcohol referred to should preferably be ethyl alcohol or isopropyl alcohol, although other alcohols may be used.

In the practice of the present invention, a typical soap gel may be formed and melted, or the constituents may be mixed at a temperature which will permit such an admixture to be fluid. A useful quantity of chemical which contains an aluminum hydroxy constituent or substituent in an active perspirant inhibiting state and a desired amount of an alkali salt of an organic acid sufficient to permit a 10% solution of all the constituents of the stick to have a pH of at least 7 may then be stirred into the melted gel. The resulting product, upon cooling, will solidify, apparently without any adverse effects flowing from the presence of the aluminum hydroxy constituent, into a stable stick. Also the composition may have incorporated therein moisture retaining substances and perfumes. Furthermore, there may be incorporated into the stick various recognized deodorant materials, for example, dihydroxy halogenated diphenyl methane, such as the widely used hexachlorophene. The resultant stick-type product is similarly stable and exhibits unusual qualities for the reduction in quantity of perspiration as well as preventing the development of odor.

*Example I*

An anti-perspirant stick is prepared from the following ingredients, all proportions being by weight.

| | Parts |
|---|---|
| Propylene glycol | 34 |
| Sodium stearate | 7½ |
| Alcohol (95%) (ethyl alcohol) | 34 |
| Aluminum hydroxide gel (10% $Al_2O_3$) | 10 |

Perfume and material such as hexachlorophene may be added in small proportions as desired, with or without small proportions of Carbitol.

In preparing the stick, the alcohol, sodium stearate and propylene glycol are mixed and heated to about 70° C. and maintained at that temperature until the sodium stearate is completely dissolved. The aluminum hydroxide gel is then added while stirring to form a smooth mixture, and stirred while the temperature is permitted to drop to around 62° C., this stirring going on for about fifteen minutes.

If perfume is added it should be added just before pouring into molds. The final mixture is poured into molds at room temperature. The product may be poured into molds consisting of elements of the package in which the product is to be sold, as described in U.S. Patent No. 2,854,133.

The order of addition of ingredients in the examples may be varied without apparent effect on the final product. Optional ingredients such as moisture retention agents, deodorants and perfumes may be added in any order, although it is obviously desirous for economic reasons to add the perfume just before pouring.

*Example II*

The same procedure is followed as in Example I, except that 50 parts propylene glycol, 6 parts of sodium stearate and 10 parts of aluminum hydroxide gel are employed.

*Example III*

An anti-perspirant stick is prepared from the following ingredients. Relative proportions are set forth as parts per hundred by weight.

| | Parts |
|---|---|
| Alcohol (95%) | 69.00 |
| Sodium stearate | 6.90 |
| Water | 12.80 |
| Carbitol | 1.40 |
| Aluminum hydroxide gel (10% $Al_2O_3$) | 9.20 |
| Perfume | 00.45 |
| Hexachlorophene | 00.25 |

The alcohol, hexachlorophene, Carbitol, sodium stearate and about one-half of the water may be mixed, heated to 70° C. and maintained at 70° C. until the sodium stearate is completely dissolved. The other one-half of the water is carefully added to the aluminum hydroxide gel while stirring to form a smooth mixture. The diluted aluminum hydroxide gel is then added to the mixture in which the sodium stearate is dissolved and the resultant mixture is stirred constantly for about fifteen minutes during which the temperature is permitted to drop to from 62° to 65° C. The perfume is added just before pouring into molds. The final mixture is poured at the temperature of from 62° to 65° C. into cold (room temperature) molds. Preferably the molds are of size and shape to form a plurality of individual sticks which may be removed from the molds when cooled and packaged for sale. For example, the individual sticks may be cylindrical in form and of a size suitable for convenient use. Furthermore, the product may be poured into molds consisting of elements of the package in which the product is to be sold as disclosed in U.S. Patent No. 2,854,133.

It is important that the mixture be stirred frequently or constantly after the aluminum hydroxide gel has been added and until the mixture has cooled to the temperature range set forth. In this manner the aluminum hydroxide gel is maintained thoroughly distributed in the mixture. Stirring may be continued during pouring for the same purpose. The product will harden quickly in the relatively cool molds due to solidification of the soap gel base. The finished product is stable and needs only to be packaged in an airtight fashion to prevent evaporation of the alcohol and water to have adequate shelf life for normal channels of distribution. The finished product has been subjected to extensive tests which amply demonstrate highly desirable anti-perspirant and deodorant qualities.

*Example IV*

An anti-perspirant may be made from ingredients set forth in Example III except that the deodorant material (hexachlorophene) may be omitted. The procedure may be the same as therein set forth. The final product has highly desirable anti-perspirant qualities.

*Example V*

An anti-perspirant stick may be prepared from the following ingredients:

| | Parts |
|---|---|
| Alcohol (95%) | 74.40 |
| Sodium stearate | 6.90 |
| Carbitol | 1.40 |
| Aluminum hydroxide gel (10% $Al_2O_3$) | 9.20 |
| Water | 6.40 |
| Perfume | 0.45 |
| Hexachlorophene | 0.25 |

The ingredients may be mixed as in Example III except that the soap is dissolved in the proportionately larger quantity of alcohol instead of the alcohol and water set forth in Example III. The reduced quantity of water is used to dilute the aluminum hydroxide gel as in Example III. The final product is fully comparable with that of Example III except that a greater cooling effect will be apparent upon application to the body. The product of this Example V also may be prepared without including the hexachlorophene in the event the additional deodorant qualities imparted by hexachlorophene are not desired.

*Example VI*

The particular order of addition of the ingredients set forth in any of Examples III, IV or V may be varied without apparent effect on the final product. Thus, according to this Example VI, any of the products of Examples III, IV or V may be prepared by mixing the sodium stearate with the aluminum hydroxide gel and thereafter adding such mixture to the alcohol and water of Example III or to the alcohol of Example V. The optional ingredients such as moisture retention agents, deodorants and perfumes may be added in any order although it is preferred for economical reasons to add the perfume just before pouring. Preferably, for the purposes of this example, the aluminum hydroxide gel is in the form of a suspension in water in a concentration equivalent to 10% $Al_2O_3$ and it may be further diluted with water before mixing with the sodium stearate to facilitate dissolution of the sodium stearate.

*Example VII*

An anti-perspirant stick may be prepared from the following ingredients, all the proportions being by weight.

| | Parts |
|---|---|
| Alcohol (95%) | 75.00 |
| Propylene glycol | 1.5 |
| Sodium stearate | 7.5 |
| Water | 14.0 |
| Aluminum hydroxide gel (10% $Al_2O_3$) | 5.0 |
| Sodium lactate (50% solution) | 10.0 |

The alcohol, glycol, sodium stearate and water were mixed to form a smooth mixture in accordance with the procedure set forth in Example III. The diluted aluminum hydroxide gel and sodium lactate is then added to the mixture in which the sodium stearate is dissolved and admixed therewith to form a smooth mixture. The final mixture is poured into molds at room temperature.

A 10% solution of the anti-perspirant stick has a pH of at least 7.

*Example VIII*

An anti-perspirant stick may be prepared from the following ingredients, all the proportions being by weight.

| | Parts |
|---|---|
| Alcohol (95%) | 75.00 |
| Propylene glycol | 1.5 |
| Sodium stearate | 7.5 |
| Water | 14.0 |
| Aluminum hydroxide gel (10% $Al_2O_3$) | 10.0 |
| Sodium lactate (50% solution) | 10.0 |

The same procedure as in Example VII was followed. A 10% solution of the anti-perspirant stick has a pH of at least 7.

*Example IX*

An anti-perspirant stick may be prepared from the following ingredients, all the proportions being by weight.

| | Parts |
|---|---|
| Alcohol (95%) | 33.4 |
| Sodium stearate | 3.3 |
| Water | 6.3 |
| Sodium lactate (50% solution) | [1] 7.5 |
| Astringin [2] (50% solution) | [1] 2.5 |

[1] pH 6.
[2] A 50% solution of aluminum hydroxy chloride, produced in accordance with U.S. Patent No. 2,392,531, distributed by Robinson Wagner Co.

The same procedure as in Example VII was followed. A 10% solution of the anti-perspirant stick has a pH of at least 7.

*Example X*

An anti-perspirant stick may be prepared from the following ingredients, all the proportions being by weight.

| | Parts |
|---|---|
| Alcohol (95%) | 31.1 |
| Sodium stearate | 3.1 |
| Water | 5.8 |
| Sodium lactate (50% solution) | [1] 7.5 |
| Astringin [2] (50% solution) | [1] 2.5 |

[1] pH 6.4.
[2] A 50% solution of aluminum hydroxy chloride, produced in accordance with U.S. Patent No. 2,392,531, distributed by Robinson Wagner Co.

The same procedure as in Example VII was followed. A 10% solution of the anti-perspirant stick has a pH of at least 7.

*Example XI*

An anti-perspirant stick may be prepared from the following ingredients, all the proportions being by weight.

| | Parts |
|---|---|
| Alcohol (95%) | 31.1 |
| Sodium stearate | 3.1 |
| Water | 5.8 |
| Sodium lactate (50% solution) | [1] 7.5 |
| Chlorhydrol [2] (50% solution) | [1] 2.5 |

[1] pH 7.6.
[2] A 50% solution of aluminum chlorhydroxy complex, produced in accordance with U.S. Patent No. 2,196,016, distributed by Reheis Company, Inc.

The same procedure as in Example VII was followed. A 10% solution of the anti-perspirant stick has a pH of at least 7.

*Example XII*

An anti-perspirant stick may be prepared from the following ingredients, all the proportions being by weight.

| | Parts |
|---|---|
| Alcohol (95%) | 62.2 |
| Sodium stearate | 6.2 |
| Water | 11.6 |
| Sodium lactate (50% solution) | 28.0 |
| Basic aluminum chloride compositions produced from Example I of U.S. Patent No. 2,392,153 | 2.0 |

The same procedure as in Example VII was followed. A 10% solution of the anti-perspirant stick has a pH of at least 7.

*Example XIII*

An anti-perspirant stick is prepared from the following ingredients, all the proportions being by weight.

| | Parts |
|---|---|
| Alcohol (95%) | 75.00 |
| Proplene glycol | 5.00 |
| Sodium stearate | 7.00 |
| Water | 8.50 |
| Aluminum hydroxide gel (10% $Al_2O_3$) | 5.00 |
| Sodium zirconium lactate solution (42.95%) | 5.00 |
| Hexachlorophene | 0.25 |
| Perfume | 0.60 |

The alcohol, hexachlorophene, sodium stearate, propylene glycol and a portion of the water were mixed following generally the procedure of Example III. The diluted aluminum hydroxide gel and the sodium zirconium lactate are then added and admixed to form a smooth mixture. The final product was poured at 60° C. into molds and allowed to harden.

Example XIV

An anti-perspirant stick is prepared from the following ingredients, all the proportions being by weight.

| Ingredient | Parts |
|---|---|
| Alcohol (95%) | 75.00 |
| Sodium stearate | 7.50 |
| Carbitol | 1.50 |
| Water | 14.00 |
| Aluminum hydroxide gel (10% $Al_2O_3$) | 10.00 |
| Sodium zirconium lactate (42.95%) | 10.00 |
| Hexachlorophene | 0.25 |
| Perfume | 0.60 |
| Perfume fixative | 0.10 |

The above ingredients were mixed following the general procedure of Example VII to form a firm stick.

Example XV

Following the procedure of the previous examples, an anti-perspirant stick was made from the following ingredients, all the proportions being by weight.

| Ingredient | Parts |
|---|---|
| Alcohol (95%) | 56.00 |
| Sodium stearate | 7.50 |
| Carbitol | 1.50 |
| Water | 14.00 |
| Aluminum hydroxide gel (10% $Al_2O_3$) | 8.08 |
| Sodium zirconium lactate (42.95%) | 2.50 |
| Hexachlorophene | 0.25 |
| Perfume | 0.60 |

Example XVI

An anti-perspirant stick is prepared from the following ingredients, all the proportions being by weight.

| Ingredient | Parts |
|---|---|
| Alcohol (95%) | 75.00 |
| Sodium stearate | 7.50 |
| Carbitol | 1.50 |
| Water | 14.00 |
| Aluminum hydroxide gel (10% $Al_2O_3$) | 5.00 |
| Sodium zirconium lactate (42.95%) | 5.00 |
| Hexachlorophene | 0.25 |
| Perfume | 0.60 |

The above ingredients were mixed following the general procedure of Example VII to form a firm stick.

It is believed that the minimum level of anti-perspirant agent which may be added to the stick is limited essentially by practicality. That is to say, if only two parts by weight per hundred of the final product contains an anti-perspirant agent such as aluminum hydroxide gel (10% $Al_2O_3$), the anti-perspirant qualities of the stick would be comparatively slight. However, useful anti-perspirant qualities are exhibited with as little as about five parts per hundred of anti-perspirant agents such as aluminum hydroxide gel (10% $Al_2O_3$) and a still more effective product is achieved by the use of about 10 parts per hundred.

The following table shows satisfactory levels of constituents present in my sodium stearate soap gel stick.

TABLE I

| Ingredients: | Percent by weight based on all the ingredients present in the stick |
|---|---|
| Alcohol and/or glycol | 40–87. |
| Sodium stearate | 2.9–12. |
| Anti-perspirant agent | At least about 2, preferably at least about 5. |
| Water (total water in the stick) | 4–48. |

The term "anti-perspirant agent" in Table I refers to complexes, compounds, and compositions which contain an aluminum hydroxy moiety in an active perspirant-inhibiting state and includes a sufficient amount of a neutralizing-complexing agent to permit a 10% aqueous solution of all the ingredients of the stick to have a pH of at least 7 when such a solution would otherwise have a pH below 7. Thus, this term includes aluminum hydroxide gel (10% $Al_2O_3$) as well as the complexes produced by combining or admixing a neutralizing-complexing agent with the above referred to complexes produced by the examples set forth in U.S. Patents Nos. 2,392,531, 2,196,016 and 2,392,153. When the anti-perspirant agent in Table I is aluminum hydroxide gel, the gel contains aluminum hydroxide, in water, in a quantity equivalent to at least about 2% by weight, preferably at least about 5% by weight, of the stick and has a concentration calculated in terms of $Al_2O_3$ of at least about 10% for each 100 parts of the aqueous aluminum hydroxide.

The foregoing detailed description has been given for clearness of understanding only, and no unnecessary limitations should be understood therefrom, as modifications will be obvious to those skilled in the art.

What is claimed is:

1. A stable anti-perspirant stick comprising a soap gel base having dispersed therein within said base as an active anti-perspirant the reaction product of sodium zirconium lactate and aluminum hydroxide, said base comprising a member of the group consisting of sodium stearate-lower alkylene glycol soap gels, sodium stearate-aqueous lower alkyl monohydric alcohol soap gels, and mixtures thereof.

2. A stable anti-perspirant stick comprising a soap gel base having aluminum hydroxide gel dispersed therein as an active anti-perspirant, said base comprising a member of the group consisting of sodium stearate-lower alkylene glycol soap gels, sodium stearate-aqueous lower alkyl monohydric alcohol soap gels, and admixtures thereof.

3. The stable anti-perspirant stick of claim 2 wherein said base member comprises sodium stearate-aqueous ethyl alcohol soap gels.

4. A stable anti-perspirant stick having a pH of at least 7 as determined in 10% aqueous solution and being stable only under said pH conditions, said stick having a base comprising sodium stearate in a quantity by weight representing about 2.9–12 parts per one hundred of the finished product and about 40–87 parts per one hundred of a member of the group consisting of lower alkyl monohydric alcohols, lower alkylene glycols, and admixtures thereof, and having dispersed therein, as the anti-perspirant, at least about 2 parts of aluminum hydroxide gel per one hundred.

5. The stable anti-perspirant stick of claim 4 wherein said member is propylene glycol.

6. The stable anti-perspirant stick of claim 4 wherein said member is ethyl alcohol.

7. A stable anti-perspirant stick having a pH of at least 7 as determined in 10% aqueous solution, said stick having a base comprising sodium stearate in a quantity by weight representing about 2.9–12 parts per one hundred of the finished product and about 40–87 parts per one hundred of a member of the group consisting of lower alkyl monohydric alcohols, lower alkylene glycols, and admixtures thereof, and having dispersed therein aluminum hydroxide gel consisting of aluminum hydroxide in water in a quantity equivalent to at lesat about 5 parts per one hundred, said aqueous aluminum hydroxide having a concentration calculated in terms of $Al_2O_3$ of at least about 10% for each 100 parts of the aqueous aluminum hydroxide.

8. A stable anti-perspirant stick having a pH of at least 7, said stick having a base comprising sodium stearate and a lower alkyl alcohol, and having dispersed therein an anti-perspirant selected from the group consisting of aluminum hydroxide gel and the reaction product of sodium zirconium lactate and aluminum hydroxide.

References Cited by the Examiner

UNITED STATES PATENTS 2,732,327   1/1956   Teller _____ 167—90

OTHER REFERENCES

Kalish, Drug and Cos. Ind., 79:3, September 1953, pp. 318–319, 417.

JULIAN S. LEVITT, *Primary Examiner.*

MORRIS O. WOLK, *Examiner.*

ANNA P. FAGELSON, VERA C. CLARKE,
*Assistant Examiners.*